(12) United States Patent
Riddell et al.

(10) Patent No.: US 7,976,276 B2
(45) Date of Patent: Jul. 12, 2011

(54) NOISE REDUCER FOR ROTOR BLADE IN WIND TURBINE

(75) Inventors: Scott Gabell Riddell, Greer, SC (US); Traci Marlene Vandervort, Voorheesville, NY (US); Juergen Esser, Bevergern (DE); Roger Drobietz, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/939,531

(22) Filed: Nov. 4, 2010

(65) Prior Publication Data

US 2011/0142637 A1    Jun. 16, 2011

(51) Int. Cl.
F03D 1/06 (2006.01)

(52) U.S. Cl. ........ 416/62; 416/223 R; 416/228; 416/235

(58) Field of Classification Search ............. 416/223 A, 416/223 R, 228, 62, 100, 235
See application file for complete search history.

(56) References Cited

U.S. PATENT DOCUMENTS

| | | | |
|---|---|---|---|
| 5,088,665 A | 2/1992 | Vijgen et al. | |
| 5,533,865 A | 7/1996 | Dassen et al. | |
| 6,729,846 B1 | 5/2004 | Wobben | |
| 6,733,240 B2 * | 5/2004 | Gliebe | 416/228 |
| 6,830,436 B2 | 12/2004 | Shibata et al. | |
| 7,059,833 B2 | 6/2006 | Stiesdal et al. | |
| 7,413,408 B1 * | 8/2008 | Tafoya | 416/228 |
| 7,637,721 B2 | 12/2009 | Driver et al. | |
| 7,740,206 B2 * | 6/2010 | Eaton et al. | 244/201 |
| 2007/0065290 A1 | 3/2007 | Herr | |
| 2007/0077150 A1 | 4/2007 | Llorente Gonzalez | |
| 2008/0061192 A1 | 3/2008 | Sullivan | |
| 2008/0080977 A1 | 4/2008 | Bonnet | |
| 2008/0166241 A1 | 7/2008 | Herr et al. | |
| 2008/0187442 A1 | 8/2008 | Standish et al. | |
| 2009/0016891 A1 | 1/2009 | Parsania et al. | |
| 2009/0074585 A1 | 3/2009 | Koegler et al. | |

FOREIGN PATENT DOCUMENTS

| | | |
|---|---|---|
| EP | 2028366 | 2/2009 |
| EP | 2053240 | 4/2009 |
| JP | 2000120524 | 4/2000 |
| JP | 2003254225 | 9/2003 |
| WO | WO 2008/035149 | 3/2008 |
| WO | WO 2008/113349 | 9/2008 |
| WO | WO 2009/025549 | 2/2009 |

* cited by examiner

Primary Examiner — Igor Kershteyn
(74) Attorney, Agent, or Firm — Dority & Manning, P.A.

(57) ABSTRACT

A rotor blade assembly for a wind turbine is disclosed. The rotor blade assembly includes a rotor blade having a pressure side, a suction side, a leading edge, and a trailing edge extending between a tip and a root, the rotor blade further defining a pitch axis. The rotor blade assembly further includes a noise reducer mounted to the rotor blade. The noise reducer includes a base plate defining a base line, a plurality of noise reduction features extending from the base line, and a plurality of apertures defined in the base plate. Each aperture is positioned on an opposite side of the base line from the plurality of noise reduction features such that the aperture is fully defined in the base plate.

20 Claims, 4 Drawing Sheets

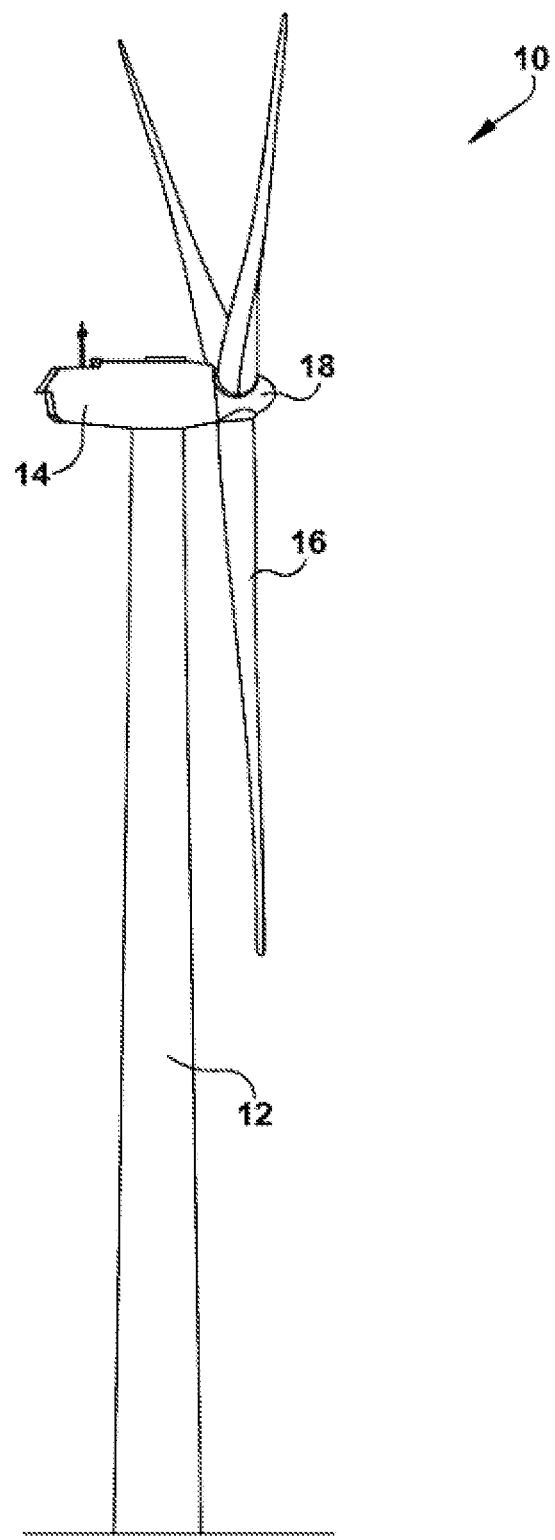
FIG. -1-

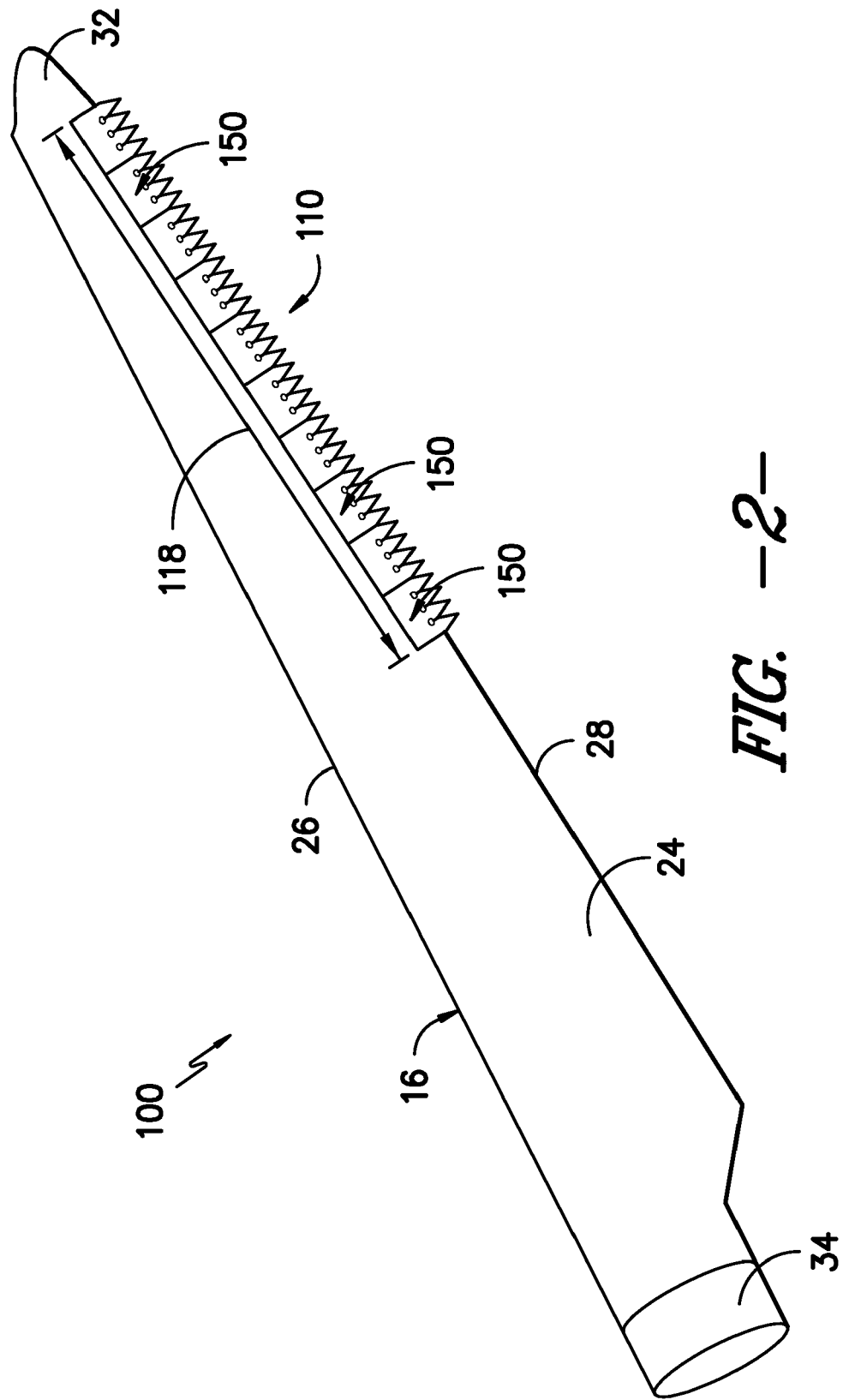
FIG. -2-

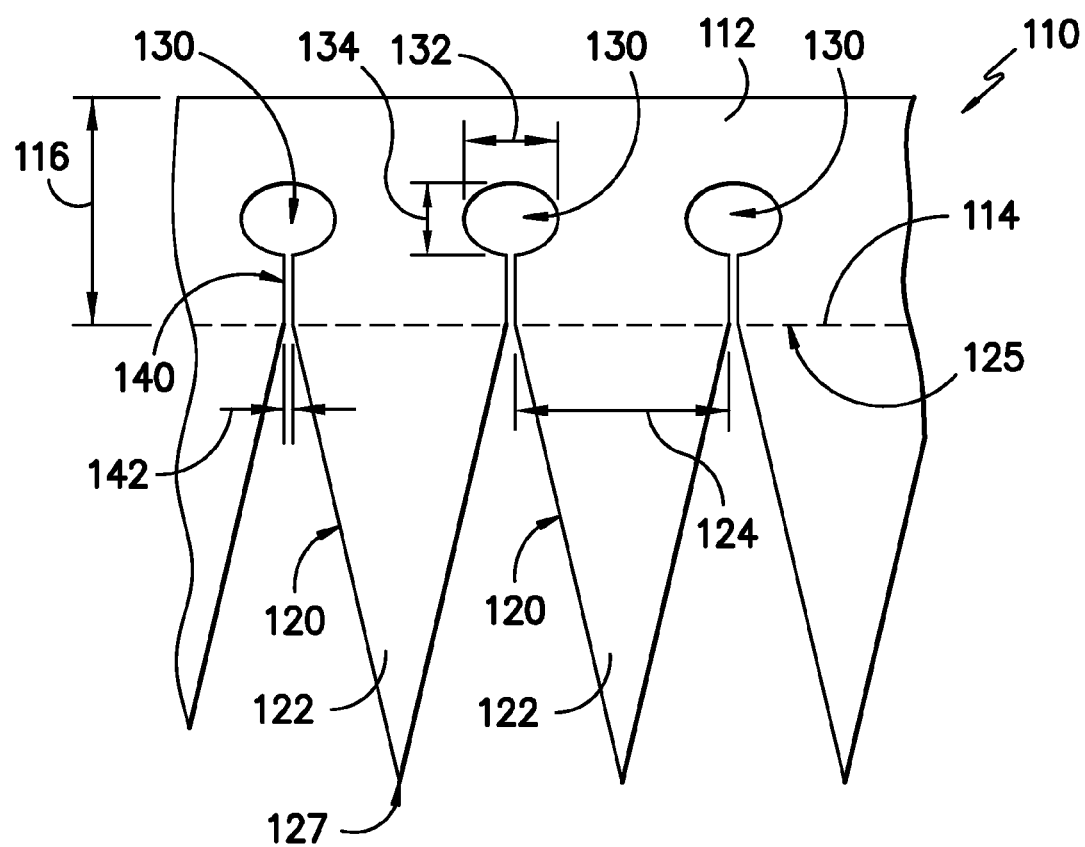
FIG. -3-

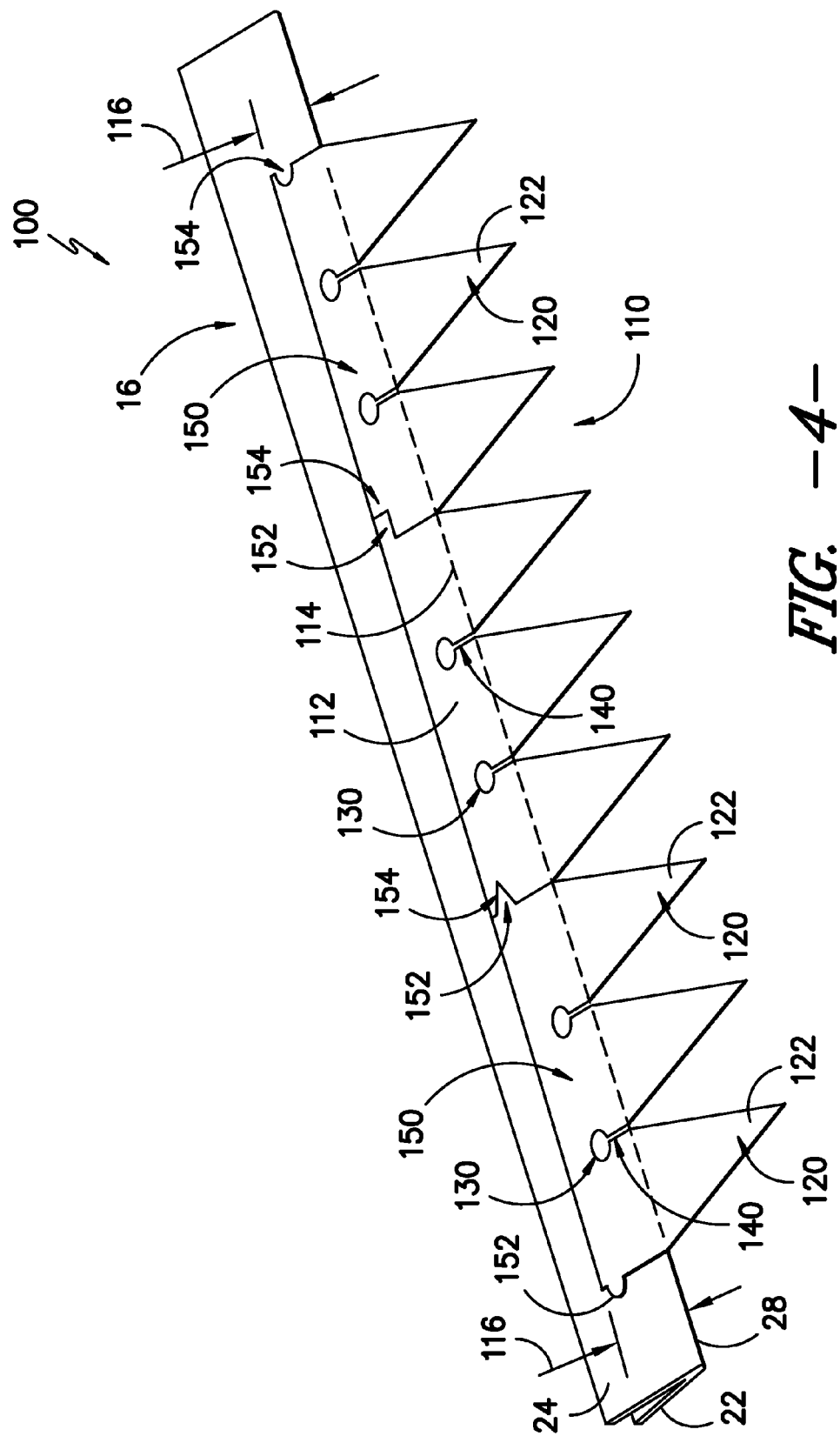
FIG. -4-

NOISE REDUCER FOR ROTOR BLADE IN WIND TURBINE

FIELD OF THE INVENTION

The present disclosure relates in general to wind turbine rotor blades, and more particularly to noise reducers mounted to the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. These components may frequently be attached adjacent to the trailing edges of the rotor blades. For example, noise reducers may be attached to the trailing edges of the rotor blades to reduce the noise and increase the efficiency associated with the rotor blade.

Typical prior art noise reducers may have a variety of disadvantages, and may not adequately reduce the noise associated with typical rotor blades. For example, many currently known noise reducers include features that cause increased strains on the noise reducers when mounted to the rotor blades. Additionally, the bonding materials utilized to mount the noise reducers to the rotor blades may further increase these strains. Further, currently known noise reducers lack features for accurately and efficiently locating the noise reducers with respect to the rotor blades.

Thus, an improved noise reducer for a rotor blade would be desired. For example, a noise reducer with improved noise reduction features would be advantageous. Additionally, a noise reducer with features for reducing the strain associated with mounting the noise reducer to a rotor blade would be desired. Further, a noise reducer with features for accurately and efficiently locating the noise reducer with respect to a rotor blade would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having a pressure side, a suction side, a leading edge, and a trailing edge extending between a tip and a root, the rotor blade further defining a pitch axis. The rotor blade assembly further includes a noise reducer mounted to the rotor blade. The noise reducer includes a base plate defining a base line, a plurality of noise reduction features extending from the base line, and a plurality of apertures defined in the base plate. Each aperture is positioned on an opposite side of the base line from the plurality of noise reduction features such that the aperture is fully defined in the base plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a perspective view of one embodiment of a rotor blade assembly of the present disclosure;

FIG. 3 is a top view of one embodiment of a noise reducer of the present disclosure; and, FIG. 4 is a perspective view of one embodiment of a noise reducer of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include a pressure side 22 (see FIG. 4) and a suction side 24 extending between a leading edge 26 and a trailing edge 28, and may extend from a blade tip 32 to a blade root 34.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a pitch axis 40. The pitch axis 40 may generally be defined with respect to the rotor hub 18 of the wind turbine 10. For example, the pitch axis 40 may extend generally perpendicularly to the rotor hub 18 and blade root 34 through the center of the blade root 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40.

As illustrated in FIGS. 2 through 4, the present disclosure may further be directed to a rotor blade assembly 100. The rotor blade assembly 100 may include a noise reducer 110 and a rotor blade 16. In general, the noise reducer 110 may be mounted to the rotor blade 16, and may reduce the aerodynamic noise being emitted from the rotor blade 16 during operation of the wind turbine 10 and/or may increase the efficiency of the rotor blade 16. In an exemplary embodiment of the present disclosure, the noise reducer 110 may be mounted to the rotor blade 16 adjacent the trailing edge 28 of the rotor blade 16. Alternatively, the noise reducer 110 may be mounted to the rotor blade 16 adjacent the leading edge 26 of the rotor blade 16, or adjacent the tip 32 or the root 34 of the rotor blade 16, or at any other suitable position on the rotor blade 16. Further, while in exemplary embodiments the noise reducer 110 may be mounted on the suction side 24 of the rotor blade 16, in alternative embodiments, the noise reducer 110 may be mounted on the pressure side 22.

The noise reducer 110 may include a base plate 112. The base plate 112 may generally be that portion of the noise reducer 110 that is mounted to the rotor blade 16. The base plate 112 defines a base line 114, which may generally define an edge of the base plate 112. As discussed below, the base plate 112 has a width 116, which may be defined from the base line 114, and a length 118.

The noise reducer 110 may further include a plurality of noise reduction features 120. As described herein and illustrated in FIGS. 2 through 4, the noise reduction features 120 in exemplary embodiments are serrations 122. However, it should be understood that the noise reduction features 120 are not limited to serrations 122. For example, in some alternative embodiments the noise reduction features 120 may be bristles. Further, any suitable noise reduction features 120 are within the scope and spirit of the present disclosure.

As shown in FIGS. 2 through 4, the noise reduction features 120, such as the serrations 122, may extend from the base line 114 away from the base plate 112. While in exemplary embodiments the serrations 122 are generally V-shaped, in alternative embodiments the serrations 122 may be U-shaped, or may have any other shape or configuration suitable for reducing the noise being emitted from and/or increasing the efficiency of the rotor blade 16 during operation of the wind turbine 10. As shown, each of the noise reduction features 120 may define a width 124. The width 124 may be defined for each noise reduction feature 120 at a base 125 of each noise reduction feature 120 (defined at the base line 114). Each noise reduction feature 120 may extend from the base 125 to a tip 127.

It should be understood that the noise reduction features 120 according to the present disclosure may have any suitable characteristics, such as width 124, length, shape, or orientation, depending on the desired noise reduction characteristics for the noise reducer 110. Further, individual noise reduction features 120 may have individual characteristics, or various groups of noise reduction features 120 may have similar characteristics, or all noise reduction features 120 may have similar characteristics, depending on the desired noise reduction characteristics for the noise reducer 110.

Further, as discussed above, the noise reducer 110 of the present disclosure may be mounted adjacent the trailing edge 28, as shown in FIGS. 2 through 4, or alternatively adjacent the leading edge 26, the tip 32, the root 34, or any other suitable position on the rotor blade 16. In exemplary embodiments, the noise reducer 110 may be positioned such that the base line 114 is aligned with, for example, the trailing edge 28 or other suitable position. As shown in FIGS. 2 through 4, for example, the base line 114 may be aligned with the trailing edge 28 such that the base plate 112 is generally fully in contact with the rotor blade 16 while the noise reduction features 120 are generally not in contact with the rotor blade 16. However, in other embodiments, the noise reducer 110 may be adjusted such that portions of the base plate 112 are not in contact with the rotor blade 16 or such that portions of the noise reduction features 120 are in contact with the rotor blade 16.

The noise reducer 110 may, in some embodiments, further include a plurality of apertures 130. The apertures 130 may be defined in the base plate 112. As shown, each aperture 130 may be positioned on an opposite side of the base line 114 from the noise reduction features 120 such that the aperture 130 is fully defined in the base plate 112. For example, no part of an aperture 130 of the present disclosure crosses the base line 114 and intrudes on or is defined in a noise reduction feature 120. The apertures 130 may each be defined in the base plate 112 at any position along the width 116 of the base plate 112. For example, in some embodiments, it may be advantageous to position the apertures 130 such that they are spaced from the base line 114. Further, in some embodiments, the apertures 130 may be positioned such that at least a portion of each aperture 130 is between adjacent noise reduction features 120 along the base line 114.

The positioning of the apertures 130 as disclosed herein may advantageously reduce the strain associated with mounting the noise reducer 110 to a rotor blade 16. For example, the apertures 130 may reduce the surface area of the base plate 112 and reduce the continuity of the base plate 112 through the length of the noise reducer 110, thus reducing the strain in the noise reducer 110 and allowing the noise reducer 110 to more easily bend while maintaining suitable stiffness and rigidity. Further, by including apertures 130 fully defined in the base plate 112, rather than partially defined in the base plate 112 and partially defined in the noise reduction features 120, the noise reducer 110 of the present disclosure may have improved noise reduction characteristics. For example, the fully defined apertures 130 may allow the wind flow over the noise reducer 110 to be manipulated such that the wind noise is reduced.

As shown, in some exemplary embodiments, the apertures 130 may have ellipse shapes. In other exemplary embodiments, the apertures 130 may have rounded-rectangular shapes. Apertures 130 with ellipse or rounded-rectangular shapes may further improve the strain and noise reduction characteristics of the present noise reducer 110. Further, as discussed above, the entire ellipse or rounded-rectangular shape of each aperture 130 may be fully defined in the base plate 112 on an opposite side of the base line 114 from the noise reduction features 120.

Each aperture 130 according to the present disclosure has an aperture width 132 and an aperture length 134. Further, an aperture 130 according to the present disclosure may have an aperture width 132 to aperture length 134 ratio that provides for improved noise reduction characteristics for the noise reducer 110. For example, in some exemplary embodiments, an aperture 130 may have an aperture width 132 to aperture length 134 ratio in the range between approximately 1.1:1 and approximately 3:1. In other exemplary embodiments, an aperture 130 may have an aperture width 132 to aperture length 134 ratio of approximately 2:1.

Further, an aperture 130 according to the present disclosure may have an aperture width 132 to noise reduction feature width 124 ratio that provides for improved noise reduction characteristics for the noise reducer 110. For example, in some exemplary embodiments, an aperture 130 may have an aperture width 132 to noise reduction feature width 124 ratio in the range between approximately 1:2 and approximately 2:9.

It should be understood, however, that the present disclosure is not limited to apertures 130 having certain ratios as discussed above, but rather that any suitable apertures 130 with any suitable ratios are within the scope and spirit of the present disclosure.

In some embodiments, the noise reducer 110 of the present disclosure may further include a plurality of slits 140. Each of the slits 140 may be defined in the base plate 112. Further, each of the slits 140 may be positioned between adjacent noise reduction features 120 along the base line 114. As shown, each slit 140 may extend between the base line 114 and one of the plurality of apertures 130. Advantageously, the slits 140 according to the present disclosure may improve the noise reduction characteristics of the noise reducer 110. For example, the slits 140 allow the wind flow over the noise reducer 110 to be manipulated such that the wind noise is reduced. Further, the slits 140 may reduce the strain associated with mounting the noise reducer 110 to a rotor blade 16. For example, the slits 140 may reduce the surface area of the base plate 112 and reduce the continuity of the base plate 112 through the length of the noise reducer 110, thus reducing the strain in the noise reducer 110 and allowing the noise reducer 110 to more easily bend while maintaining suitable stiffness and rigidity. Further, the slits 140 may space the apertures 130 from the base line 114, as discussed above.

Each slit 140 according to the present disclosure has a slit width 142. Further, the slit width 142 of a slit 140 according to the present disclosure may be sized to provide for improved noise reduction characteristics for the noise reducer 110. For example, in some exemplary embodiments, the slit width 142 of a slit 140 may be in the range between approximately 0.1 millimeters and 5 millimeters. In other exemplary embodiments, the slit width 142 of a slit 140 may be in the range between approximately 0.1 millimeters and 3 millimeters. In yet other exemplary embodiments, the slit width 142 of a slit 140 may be in the range between approximately 0.5 millimeters and 2 millimeters.

It should be understood, however, that the present disclosure is not limited to slits 140 having certain slit widths 142 as discussed above, but rather that any suitable slits 140 with any suitable slits widths 142 are within the scope and spirit of the present disclosure.

It should each individual aperture 130 and slit 140 according to the present disclosure need not have characteristics that are identical to other apertures 130 and slits 140. For example, each individual aperture 130 and slit 140 may have individual characteristics, such as width 132, length 134, and/or width 142, or various groups of apertures 130 and slits 140 may have similar characteristics, or all apertures 130 and slits 140 may have similar characteristics, depending on the desired noise reduction characteristics for the noise reducer 110.

As shown in FIG. 4, the noise reducer 110 of the present disclosure may include various features for accurately and efficiently locating the noise reducer 110 with respect to the rotor blade 16. In some embodiments, for example, the noise reducer 110 may comprise a plurality of noise reducer sections 150, as shown in FIG. 5. Each of the noise reducer sections 150 may include a portion of the base plate 112 and at least one of the plurality of noise reduction features 120. Further, each of the noise reducer sections 150 may, in some embodiments, include at least one of the plurality of apertures 130. The noise reducer sections 150 may be mounted side-by-side on the rotor blade 16, such as adjacent the trailing edge 28, to form the noise reducer 110.

As shown in FIG. 4, the width 116 of the base plate 112 may taper through the length 118, or any portion thereof, of the base plate 112. For example, the width 116 may increase through the length 118 of the base plate 112 towards the blade tip 32, or may decrease through the length 118 of the base plate 112 towards the blade tip 32, or may increase through various portions of the base plate 112 while decreasing and/or remaining constant throughout other portions of the base plate 112. In embodiments wherein the noise reducer 110 comprises a plurality of noise reducer sections 150. The tapering width 116 of the base plate 112 may allow for accurate and efficient assembly of the noise reducer sections 150 with respect to each other to form the noise reducer 110. For example, in some embodiments as shown in FIG. 5, for proper assembly of the noise reducer sections 150, the widths 116 of adjacent noise reducer sections 150 must generally match.

As shown in FIG. 4, various of the noise reducer sections 150 may include one or more male keys 152 and/or female keys 154. As shown, the male keys 152 and/or female keys 154 may be configured to mate with female keys 154 and/or male keys 152 of adjacent noise reducer sections 150. The male and female keys 152, 154 may have any suitable shapes and sizes. For example, as shown in FIG. 5, the male and female keys 152, 154 may be circular or oval, triangular, square or rectangular, or any other suitable shape. In some embodiments, the shapes and sizes of the male and female keys 152, 154 for mating adjacent noise reducer sections 150 may vary throughout the various noise reducer sections, as shown in FIG. 5. Thus, for proper assembly of the noise reducer sections 150, the male and female keys 152, 154 of adjacent noise reducer sections 150 must generally match.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
   a rotor blade having a pressure side, a suction side, a leading edge, and a trailing edge extending between a tip and a root, the rotor blade further defining a pitch axis; and,
   a noise reducer mounted to the rotor blade, the noise reducer comprising:
      a base plate defining a base line;
      a plurality of noise reduction features extending from the base line; and,
      a plurality of apertures defined in the base plate, each of the plurality of apertures positioned on an opposite side of the base line from the plurality of noise reduction features such that the aperture is fully defined in the base plate, at least a portion of each of the plurality of apertures exposed to wind flow over the noise reducer.

2. The rotor blade assembly of claim 1, wherein each of the plurality of apertures is further positioned such that at least a portion of each of the plurality of apertures is between adjacent noise reduction features along the base line.

3. The rotor blade assembly of claim 1, wherein each of the plurality of apertures has an ellipse shape.

4. The rotor blade assembly of claim 1, wherein each of the plurality of apertures has an aperture width and an aperture length, and wherein each of the plurality of apertures has an aperture width to aperture length ratio in the range between approximately 1.1:1 and approximately 3:1.

5. The rotor blade assembly of claim 4, wherein each of the plurality of apertures has an aperture width to aperture length ratio of approximately 2:1.

6. The rotor blade assembly of claim 1, wherein each of the plurality of apertures has an aperture width and each of the plurality of noise reduction features has a noise reduction feature width, and wherein each of the plurality of apertures has an aperture width to noise reduction feature width ratio in the range between approximately 1:2 and approximately 2:9.

7. The rotor blade assembly of claim 1, wherein the noise reducer further comprises a plurality of slits defined in the base plate, each of the plurality of slits positioned between adjacent noise reduction features along the base line and extending between the base line and one of the plurality of apertures.

8. The rotor blade assembly of claim 7, wherein each of the plurality of slits has a slit width, and wherein the slit width of each of the plurality of slits is in the range between approximately 0.1 millimeters and 5 millimeters.

9. The rotor blade assembly of claim 8, wherein the slit width of each of the plurality of slits is in the range between approximately 0.1 millimeters and 3 millimeters.

10. The rotor blade assembly of claim 1, wherein the base plate has a width and a length, and wherein the width tapers throughout at least a portion of the length.

11. The rotor blade assembly of claim 1, wherein the noise reducer comprises a plurality of noise reducer sections, each of the noise reducer sections comprising a portion of the base plate, at least one of the plurality of noise reduction features, and at least one of the plurality of apertures.

12. The rotor blade assembly of claim 11, wherein each of the plurality of noise reducer sections includes at least one of a male key or a female key configured to mate with a mating female key or male key of an adjacent noise reducer section.

13. The rotor blade assembly of claim 1, wherein the plurality of noise reduction features is a plurality of serrations.

14. A wind turbine, comprising:
   a plurality of rotor blades, each of the plurality of rotor blades having a pressure side, a suction side, a leading edge, and a trailing edge extending between a tip and a root, each of the plurality of rotor blades further defining a pitch axis; and,
   a noise reducer mounted to at least one of the plurality of rotor blades, the noise reducer comprising:
      a base plate defining a base line;
      a plurality of noise reduction features extending from the base line; and,
      a plurality of apertures defined in the base plate, each of the plurality of apertures positioned on an opposite side of the base line from the plurality of noise reduction features such that the aperture is fully defined in the base plate, at least a portion of each of the plurality of apertures exposed to wind flow over the noise reducer.

15. The wind turbine of claim 14, wherein each of the plurality of apertures is further positioned such that at least a portion of each of the plurality of apertures is between adjacent noise reduction features along the base line.

16. The wind turbine of claim 14, wherein each of the plurality of apertures has an aperture width and an aperture length, and wherein each of the plurality of apertures has an aperture width to aperture length ratio in the range between approximately 1.1:1 and approximately 3:1.

17. The wind turbine of claim 14, wherein each of the plurality of apertures has an aperture width and each of the plurality of noise reduction features has a noise reduction feature width, and wherein each of the plurality of apertures has an aperture width to noise reduction feature width ratio in the range between approximately 1:2 and approximately 2:9.

18. The wind turbine of claim 14, wherein the noise reducer further comprises a plurality of slits defined in the base plate, each of the plurality of slits positioned between adjacent noise reduction features along the base line and extending between the base line and one of the plurality of apertures.

19. The wind turbine of claim 18, wherein each of the plurality of slits has a slit width, and wherein the slit width of each of the plurality of slits is in the range between approximately 0.1 millimeters and 5 millimeters.

20. The wind turbine of claim 14, wherein the plurality of noise reduction features is a plurality of serrations.

* * * * *